Nov. 9, 1937. N. M. McCULLOUGH ET AL 2,098,505
GOVERNOR
Filed March 2, 1934
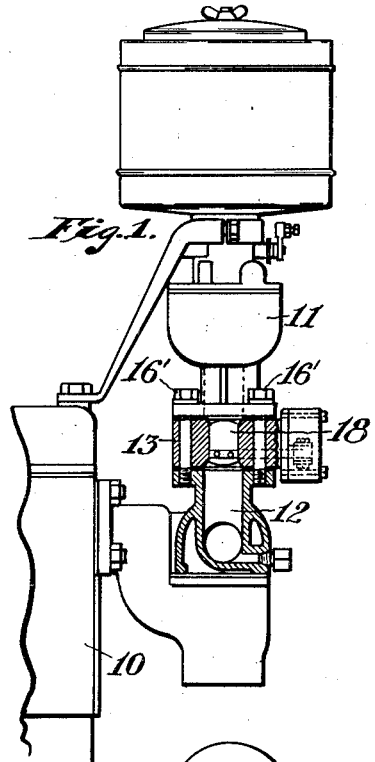
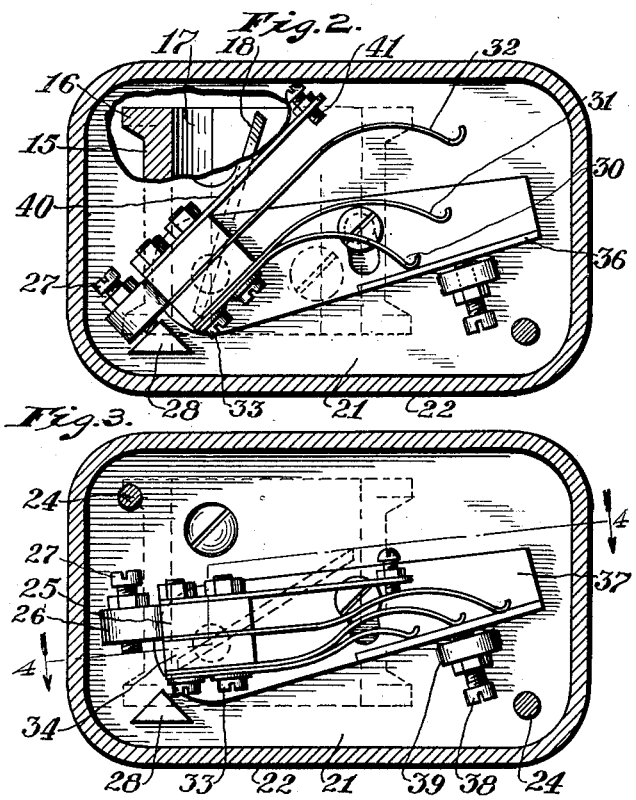
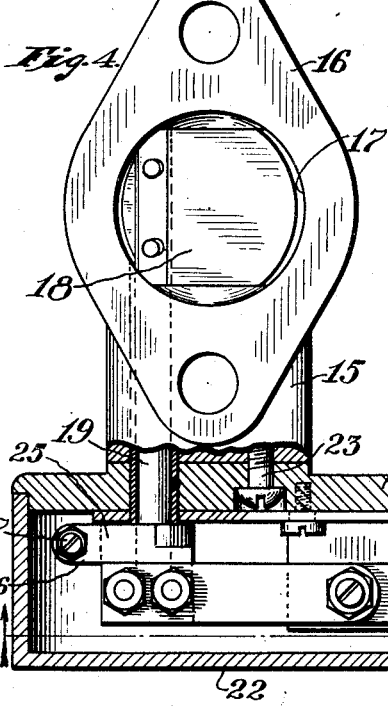
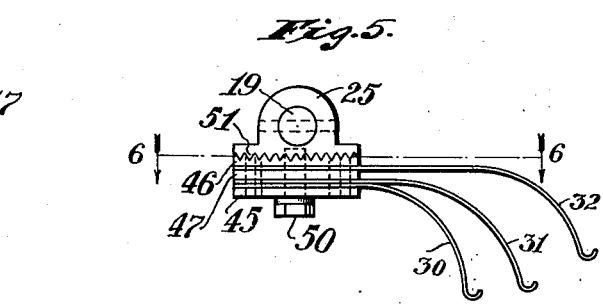
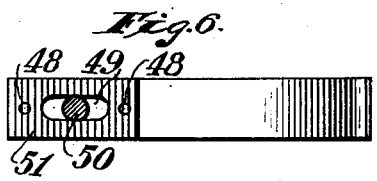
Inventors
NEEL M. McCULLOUGH,
CALVIN C. COOK.
Attorneys Patented Nov. 9, 1937

2,098,505

UNITED STATES PATENT OFFICE 2,098,505

GOVERNOR

Neel M. McCullough and Calvin C. Cook, Anderson, Ind., assignors to Pierce Governor Company, Anderson, Ind., a corporation of Indiana Application March 2, 1934, Serial No. 713,680

4 Claims. (Cl. 137—152)

Our invention relates to speed-governors for internal combustion engines and specifically to speed-governors of the type in which the speed of the engine is controlled by regulating the supply of explosive mixture to it in accordance with the velocity of that mixture.

It is the object of our invention to produce a governor which will have the desired degree of sensitivity in all positions of the valve which regulates the rate of mixture-flow. A further object of our invention is to produce a governor of this type which, while simple and of economical construction, will still be positive in action and adequately sturdy and durable to withstand use in an automobile vehicle. Another object of our invention is to produce a governor in which adjustments are provided to regulate the sensitivity as well as the maximum speed which the governor permits. Still another object of our invention is to produce a governor in which there will be no possibility of the regulating valve becoming locked in closed position.

In carrying out our invention we mount an unbalanced valve in the mixture-supply conduit of the engine whose speed is to be regulated, the valve being so arranged that it tends to move toward closed position under the influence of the fluid-stream in which it is located. Movement of the valve toward closed position is opposed by a plurality of springs or other yielding means which come successively into action as the valve approaches closed position. In association with the springs we provide an adjustment by means of which the effective force they exert upon the valve may be regulated as desired to control maximum engine speed. Other, and more detailed, features of our invention will become apparent from the following description.

The accompanying drawing illustrates embodiments of our invention: Fig. 1 is a view illustrating our speed governor associated with an internal combustion engine and its carburetor, parts of the structure being broken away to show the governing device in vertical section; Fig. 2 is a vertical section on the line 2—2 of Fig. 4 showing the moving parts of the governor in the positions they occupy when the engine is not running; Fig. 3 is a view similar to Fig. 2 but showing the parts in the positions they occupy when the device is imposing maximum speed-limiting effect on the engine; Fig. 4 is a top plan view of the device with parts thereof broken away and shown in section on the line 4—4 of Fig. 3; Fig. 5 is an elevation of a modified form of spring-assembly for use in our speed-governor; and Fig. 6 is a section on the line 6—6 of Fig. 5.

Our speed governor may be used in association with any desired type of engine or carburetor. The installation indicated in Fig. 1 comprises an engine 10 equipped with a carburetor 11 of the down-draft type, the combustible mixture produced in the carburetor being conducted to the cylinders of the engine 10 through an intake-manifold 12. Our speed-governor, which is indicated in its entirety at 13 in Fig. 1, is disposed between the carburetor and the intake manifold. The speed governor illustrated in the drawing comprises a body 15 having at its top and bottom flanges 16 by means of which it may be connected in operative position to the carburetor and intake manifold as by means of screws or bolts 16'.

In line with the mixture-passages in the carburetor and intake manifolds, the body 15 is provided with a mixture-passage 17 in which is located a governing valve 18. Conveniently, the valve 18 is a butterfly valve eccentrically mounted through the medium of a valve shaft 19 the axis of which is displaced laterally from the axis of the passage 17. The valve is so disposed that the reaction upon it of the mixture flowing through the passage 17 tends to move the valve toward closed position. That is, in the down-draft installation shown in Fig. 1, the valve 18 extends generally upwardly from the shaft 19.

Because of the eccentric mounting of the valve 18, the passage 17 is provided with parallel flat sides and the valve 18 has corresponding parallel flat sides so that when the valve is completely closed substantially all flow through the passage 17 will be prevented. At the ends of the passage 17, these flat sides of the passage-walls are relieved so as to make the inlet and outlet openings of the passage substantially circular and of a diameter conforming to that of the passages in the carburetor and manifold.

Adapted to be secured against one side of the body 15 is a hollow casing comprising a base 21 and a cover 22, the base being held against the side of the body 15 as by means of screws 23, and the cover being secured to the base as by means of screws 24. The mechanism controlling the position of the valve 18 is located within the casing formed by the base 21 and cover 22, and such mechanism may be protected against tampering by suitably sealing the screws 24.

The shaft 19 projects into the interior of the casing 21—22 where it is provided with means for the attachment of the springs which oppose closing movement of the valve. In the particular structure illustrated in the drawing, this means takes the form of a block 25 that may have a laterally projecting ear 26 through which passes a screw 27 that cooperates with an abutment 28 on the base 21 to limit opening movement of the valve 18.

The springs which regulate the position of the valve 18 when a combustible mixture is flowing through the passage 17 preferably are leaf springs attached to the block 25. As is clear from the drawing, there are three of such springs 30, 31, and 32. Conveniently, they are attached to the block 25 by means of bolts 33 which pass through one end of each of the springs and through the block 25.

We find it desirable to separate the inner ends of some of the springs 30, 31, and 32, and to this end we provide a spacer 34 through which the bolts 33 also pass. As shown in the drawing, the inner ends of the two springs 30 and 31 are secured in contact with each other between the heads of the bolts 33 and the block 25, while the inner end of the spring 32 is clamped between the block 25 and the spacer 34. Each of the springs 30, 31, and 32 may be arcuate in shape and may have its extreme outer end bent upwardly on a relatively short radius for co-operation with the upper surface of an abutment 36, although the springs may have other suitable shapes.

The abutment 36 is conveniently formed as a laterally projecting ear upon a sheet-metal arm 37 which is pivotally mounted within the casing 21—22 co-axially with the shaft 19. An adjusting screw 38 which passes through a boss 39 on the base 21, engages the lower surface of the abutment 36, and serves to hold the arm 37 in fixed angular position against the forces of the springs 30, 31, and 32 acting upon it.

The material and dimensions of the springs 30, 31, and 32 are selected with consideration for the size of the passage 17 and the characteristics of the engine which is to be regulated, and also with due regard for the effect of fluid pressure upon the valve 18 in various positions and at various rates of mixture-flow. The elevational views in the drawing, which are substantially to scale, indicate lengths and shapes of springs 30, 31, and 32 suitable for used with a 1½-inch engine-carburetor. One governor of this size which has proven successful embodied springs 30, 31, and 32 of spring steel having a width of three-eighths of an inch and thicknesses respectively of 0.008, 0.014, 0.022 inch.

As is obvious, when the valve 18 is in or near its fully open position, the force imposed upon it by the gases flowing through the passage 17 is relatively small. Further, such force will have a relatively short lever-arm. As the valve moves toward closed position, its projected area increases, the effective impact pressure acting upon it increases, and the effective lever arm of such pressure is increased. Further, when the valve is so near closed position as to effect a very substantial restriction of the passage 17, there is an appreciable differential static pressure existing on opposite sides of the valve which tends further to move it toward closed position. It is for this reason that the springs 30, 31, and 32 are made of successively increasing stiffness.

When the engine is running slowly under no load or under only a light load, the spring 30 is in engagement with the abutment 36, and the free ends of the springs 31 and 32 are above such abutment. As the speed of the gas flowing past the valve 18 increases and the valve is moved toward closed position, the spring 31 comes into engagement with the abutment 36 and aids the spring 30 in opposing closing movement of the valve; and as the valve approaches further toward closed position, the relatively stiff spring 32 comes into action and adds its effect to that of the springs 30 and 31.

We find it advisable, just before the valve 18 will reach completely closed position, to impose upon it a substantial increment of load in order to prevent closure of the valve which would result in a vacuum lock. One method of accomplishing this result is to shorten the effective length of the relatively stiff spring 32. To this end, we may mount upon the upper surface of the block 25 a relatively rigid arm 40 in the outer end of which is an adjustable stop-screw 41 positioned to engage the upper surface of the spring 32 to shorten its effective length after it has been flexed slightly.

The satisfactory operation of a spring-loaded governor of the type described depends upon the careful regulation of the flexibility characteristics of the springs. Springs which are too flexible, or too sensitive,—i. e., springs which permit too great a movement of the valve 18 for a given change in mixture-velocity—are unsatisfactory in that they cause the engine to "surge". On the other hand, if the spring or springs acting upon the valve 18 are insufficiently sensitive (too stiff) the device will operate inadequately to control engine speed satisfactorily; for if an increase in mixture velocity does not cause a proper degree of closing movement of the valve, a further increase in mixture velocity and engine speed is permitted.

Giving consideration to the widely varying effective fluid pressures which act upon the valve 18 and to the widely varying lever-arms of such effective pressures with variation in the angular position of the valve, it is apparent that the character of the loading which the springs impose upon the valve must vary considerably. When the valve is near its open position the turning movement to which it is subject as the result of fluid-pressure upon it is comparatively small, and the spring-load upon the valve must therefore be relatively light; whereas when the valve is nearly closed the effect of fluid-pressure upon it is comparatively large and the spring-load must be relatively large. Further, a given movement of the nearly open valve will produce a much less proportional change in the unobstructed area of the mixture-conduit than will the same movement when the valve is nearly closed; and the spring or springs acting on the nearly open valve must therefore be relatively flexible and those acting on the nearly closed valve must be relatively stiff.

A speed governor embodying our invention fulfills all these requirements. When the valve is in or near its open position, only the relatively light, flexible spring 30 opposes its closing movement. During the intermediate portion of closing movement of the valve 18, opposition to closing movement is imposed by both the spring 30 and the spring 31; and as the valve nears closed position all the springs are effective to oppose it.

In the modification of our invention illustrated in Figs. 5 and 6 the inner ends of the springs 30, 31, and 32 are clamped between two clamping members 45 and 46, a spacer 47 being interposed between the ends of the springs 31 and 32. The sub-assembly of springs, clamping members, and spacer may be made permanent, as by riveting the clamping members 45 and 46 together through the medium of rivets 48. The sub-assembly thus made is provided with a longitudinal slot 49 for the reception of a clamp-screw 50 mounted in the block 25 on the valve-shaft 19. By providing the interengaging faces of the block 25 and the upper clamping member 46 with a series of interfitting serrations 51 a number of different positions of the sub-assembly are positively defined in any one of which it may be held by the screw 50.

The arrangement illustrated in Figs. 5 and 6 permits a regulation of the sensitivity of the governor, as it permits the effective lever-arm of the spring-load to be varied. If the governor is insufficiently responsive to changes in the velocity of mixture-flow through the passage 17, the springs 30, 31, and 32 may be moved to the left in Fig. 5. Such an adjustment would decrease the lever-arm of the forces acting on the outer ends of the springs and would render the springs less effective in their opposition to closing movement of the valve, and would thus increase the extent of valve-movement for a given change in the velocity of mixture-flow in the passage 17. On the other hand, if the governor is too sensitive, the springs may be moved to the right in Fig. 5 to increase the lever-arm of the forces acting on their outer ends. Such an adjustment would decrease the angular movement of the valve which resulted from any given change in the velocity of mixture-flow through the passage 17.

The specific arrangements illustrated in the drawing and described above are intended merely as examples of our invention, which may take many different forms. The precise shape and number and flexibility characteristics of the springs which load the unbalanced throttle-valve 18, together with other details of construction, may be varied to suit the particular engine in association with which the governor is to be used. Similarly, the particular means shown for effecting the various adjustments may be changed to suit conditions of operation or manufacture.

We claim as our invention:

1. A spring structure for controlling movement of the throttle valve in a speed-governor of the velocity type, comprising a saddle adapted for attachment to the shaft of said valve, a leaf spring secured to said saddle and extending generally radially therefrom, an arm secured to said saddle and extending in spaced relation to said spring, and an adjustable abutment carried by said arm and adjustable toward and away from said spring.

2. In a speed-governor for internal-combustion engines, a rotatable control shaft, a plurality of leaf springs rotatable with said shaft, said springs being of successively greater length and stiffness and having their outer ends angularly spaced, a normally stationary abutment positioned to be engaged successively by the outer ends of said springs, the shortest and most flexible of said springs engaging said abutment first in the closing movement of the valve, and means for adjustably varying the effective lengths of said springs.

3. In a speed governor for internal-combustion engines, a rotatable control shaft, a leaf spring swingable with said shaft and extending generally radially of the shaft-axis, an abutment engaging said spring at a point remote from the shaft-axis, means for adjusting the position of said abutment in the path of spring movement, and provisions independent of said means for varying the distance between the shaft-axis and the point at which the spring engages the abutment.

4. In a speed governor for internal-combustion engines, a rotatable control shaft, a leaf spring swingable with said shaft and extending generally radially of the shaft-axis, an abutment engaging said spring at a point remote from the shaft axis, and a second abutment disposed on the opposite side of said spring from said first abutment and between said first abutment and the shaft-axis, said second abutment being movable with said shaft and adjustable toward and away from said spring.

NEEL M. McCULLOUGH.
CALVIN C. COOK.